United States Patent
Qi et al.

(10) Patent No.: US 6,844,416 B2
(45) Date of Patent: Jan. 18, 2005

(54) POLYCARBONATES

(75) Inventors: Yu Qi, Oakville (CA); Nan-Xing Hu, Oakville (CA); H. Bruce Goodbrand, Hamilton (CA); Paul F. Smith, Oakville (CA); C. Geoffrey Allen, Waterdown (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/428,969

(22) Filed: May 2, 2003

(65) Prior Publication Data

US 2004/0220372 A1 Nov. 4, 2004

(51) Int. Cl.$^7$ .............................................. C08G 64/00
(52) U.S. Cl. ..................... 528/196; 430/56; 430/58.05; 430/58.07; 430/59.05; 430/83; 528/198
(58) Field of Search ................................ 430/56, 58.05, 430/58.07, 59.05, 83; 528/196, 198

(56) References Cited

U.S. PATENT DOCUMENTS

| | | | |
|---|---|---|---|
| 5,645,965 A | 7/1997 | Duff et al. ..................... | 430/59 |
| 6,043,334 A | 3/2000 | Kanamaru et al. .......... | 528/196 |
| 6,200,715 B1 | 3/2001 | Fuller et al. ................ | 430/59.6 |
| 6,214,505 B1 | 4/2001 | Ong et al. ................ | 430/58.65 |
| 6,287,737 B1 | 9/2001 | Ong et al. .................. | 430/58.8 |

OTHER PUBLICATIONS

Yu Qi et al., U.S. Appl. No. 10/390,057, "Photoconductive Imaging Members", filed Mar. 14, 2003.

Yu Qi et al., U.S. Appl. No. 10/390,061, "Polycarbonates", filed Mar. 14, 2003.

Yu Qi et al., U.S. Appl. No. 10/389,858, "Photoconductive Imaging Members", filed Mar. 14, 2003.

*Primary Examiner*—Terressa Boykin
(74) *Attorney, Agent, or Firm*—Eugene O. Palazzo; Fay, Sharpe, Fagan, Minnich & McKee LLP

(57) ABSTRACT

A polycarbonate comprised of a repeating unit represented by Formula (I)

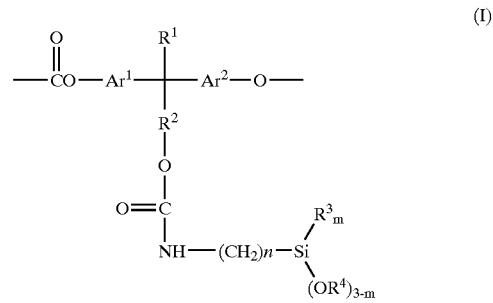

with $R^1$, $R^2$, $R^3$ and $R^4$ being, for example, alkyl; Ar being, for example, aryl; and m representing the number of groups.

29 Claims, No Drawings

POLYCARBONATES

COPENDING APPLICATIONS AND PATENTS

Illustrated in U.S. Ser. No. 10/390,057, filed on Mar. 14, 2003 on Photoconductive Imaging Members, the disclosure of which is totally incorporated herein by reference, is a photoconductive imaging member comprised of a photogenerating layer, and a charge transport layer, and wherein said charge transport layer comprises a crosslinked polycarbonate component containing a repeating segment of the formula

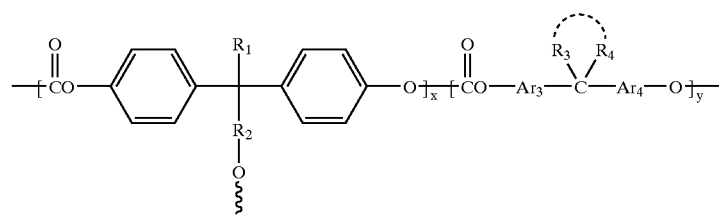

wherein $R_1$ is selected from the group consisting of hydrogen, alkyl and aryl; $R_2$ represents a divalent linkage; $Ar_3$ and $Ar_4$ each independently represent aromatic groups; $R_3$ and $R_4$ are independently selected from the group consisting of hydrogen, alkyl, and aryl; and wherein x and y represent the mole fractions of the repeating segments; illustrated in U.S. Ser. No. 10/390,061, filed Mar. 14, 2003 on Polycarbonates, the disclosure of which is totally incorporated herein by reference, is a polycarbonate comprised of a repeating segment represented by Formula (I)

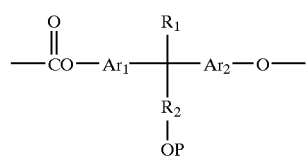

(I)

wherein $R_1$ is selected from the group consisting of hydrogen, alkyl, and aryl; $R_2$ represents a divalent linkage selected from the group consisting of alkylene optionally containing one or more heteroatoms of halogen, nitrogen, oxygen, sulfur, silicon, or phosphorus, arylalkylene, and arylene; $Ar_1$ and $Ar_2$ each independently represent aromatic groups; and P represents a hydrogen atom, or a hydroxyl protective group; and illustrated in U.S. Ser. No. 10/389,858, filed Mar. 14, 2003 on Photoconductive Imaging Members, the disclosure of which is totally incorporated herein by reference, is a photoconductive imaging member comprised of a photogenerating layer, and a charge transport layer, and wherein said charge transport layer comprises a crosslinked polycarbonate component comprised of

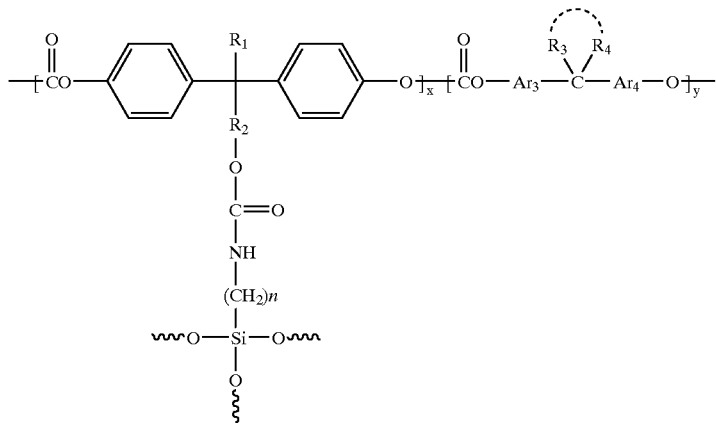

wherein $R_1$ is selected from the group consisting of hydrogen, alkyl, a halogenated alkyl, and aryl; $R_2$ represents a divalent linkage; $Ar_3$ and $Ar_4$ each independently represent aromatic groups; $R_3$ and $R_4$ are independently selected from the group consisting of hydrogen, alkyl and aryl; n represents the number of segments; and wherein x and y are the mole fractions of the repeating segments with the value of x+y being equal to 1.

Illustrated in U.S. Pat. No. 6,214,505, the disclosure of which is totally incorporated herein by reference, is a photoconductive imaging member comprised of a photogenerating layer and a charge transport layer, and wherein the charge transport layer contains a poly(imide-carbonate) resin binder of (I) or (II)

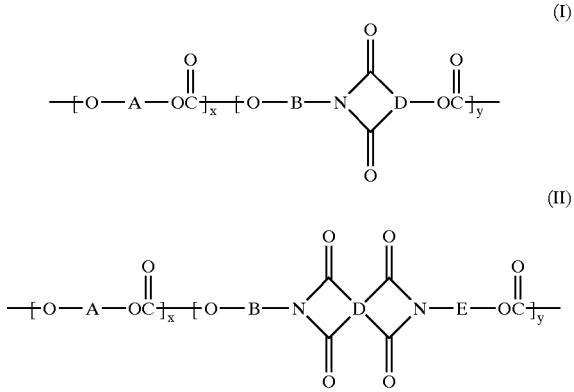

wherein A, B and E are divalent linkages; D is a trivalent linkage in (I) and a tetravalent linkage in (II); and x and y represent mole fractions wherein the sum of x+y is equal to 1.

Further, illustrated in U.S. Pat. No. 5,645,965, the disclosure of which is totally incorporated herein by reference, are symmetrical perylene photoconductive members.

The appropriate components and processes of the above copending applications may be selected for the present invention in embodiments thereof.

BACKGROUND

This invention is generally directed to polycarbonates, and more specifically, to a polycarbonate comprising reactive pendant silane groups along the polymer backbone, and processes thereof. The polycarbonates can be selected as photoconductive resin binders and wherein the binders provide excellent compatibility when, for example, reinforcement particles, such as silica, titanium oxide, alumina and the like, are added thereto.

The aforementioned polycarbonates can also be crosslinked by hydrolysis and condensation of the silane functionality. The crosslinked polycarbonates can be utilized as binder resins for layered photoresponsive imaging members, and more specifically, for charge transporting layers, to provide excellent electrical characteristics, excellent resistance to mechanical abrasion, and therefore extended photoreceptor life, compatibility with hole transport components, such as aryl amines, resistance to solvents, such as methylenechloride, tetrahydrofuran, and chlorobenzene, and abrasion resistance to bias charging rolls.

REFERENCES

Polycarbonates are known engineering thermoplastics and have a number of commercial and industrial applications, particularly where the application requires materials bearing toughness, flexibility, impact resistance, and high heat distortion temperatures. One of the applications of polycarbonates is as the binder resin used in photoresponsive imagining members, especially in charge transporting layers (CTL), for their good mechanical properties, transparency, and miscibility with charge transporting molecules. However, while the polycarbonates enjoy many excellent properties they have certain drawbacks in that they are somewhat susceptible to attack by bias charging (BCR) wear and mechanical abrasion, and as a result, the usage life of photoreceptors can be limited, for example, from about 150,000 to 250,000 imaging cycles.

U.S. Pat. No. 6,043,334, the disclosure of which is totally incorporated herein by reference, discloses the use of crosslinked polycarbonates as the charge transporting layer binder polymer. Polycarbonates with various different crosslinking functional groups have been illustrated, for example carbon—carbon double bonds, epoxides, amino groups, thiols, acids and acid anhydrides, in the side chains, ends or main chain.

U.S. Pat. No. 6,200,715 B1, the disclosure of which is totally incorporated herein by reference, illustrates the use of pendent acrylate as a reactive site to crosslink polycarbonates and poly(arylene ether)s via free radical polymerization. Disclosed in U.S. Pat. No. 5,645,965, the disclosure of which is totally incorporated herein by reference, are photoconductive imaging members with perylenes and a number of charge transports, such as amines.

Illustrated in U.S. Pat. No. 6,287,737, the disclosure of which is totally incorporated herein by reference, is a photoconductive imaging member comprised of a supporting substrate, a hole blocking layer thereover, a photogenerating layer and a charge transport layer, and wherein the hole blocking layer is comprised of a crosslinked polymer derived from the reaction of a silyl-functionalized hydroxyalkyl polymer of Formula (I) with an organosilane of Formula (II) and water.

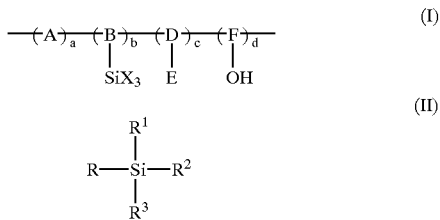

wherein A, B, D, and F represent the segments of the polymer backbone; E is an electron transporting moiety; X is selected from the group consisting of chloride, bromide, iodide, cyano, alkoxy, acyloxy, and aryloxy; a, b, c, and d are mole fractions of the repeating monomer units such that the sum of a+b+c+d is equal to 1; R is alkyl, substituted alkyl, aryl, or substituted aryl, with the substituent being halide, alkoxy, aryloxy, and amino; and $R^1$, $R^2$, and $R^3$ are independently selected from the group consisting of alkyl, aryl, alkoxy, aryloxy, acyloxy, halogen, cyano, and amino, subject to the provision that two of $R^1$, $R^2$, and $R^3$ are independently selected from the group consisting of alkoxy, aryloxy, acyloxy, and halide.

Disclosed in U.S. Pat. No. 5,874,193, the disclosure of which is totally incorporated herein by reference, are photoconductive imaging members with a hole blocking layer comprised of a crosslinked polymer derived from crosslinking a alkoxysilyl-functionalized polymer bearing an electron transporting moiety. In U.S. Pat. No. 5,871,877, the disclosure of which is totally incorporated herein by reference, there are illustrated multilayered imaging members with a solvent resistant hole blocking layer comprised of a crosslinked electron transport polymer derived from crosslinking a thermally crosslinkable alkoxysilyl, acyloxysilyl or halosilyl-functionalized electron transport polymer with an alkoxysilyl, acyloxysilyl or halosilyl compound such as alkyltrialkoxysilane, alkyltrihalosilane, alkylacyloxysilane, aminoalkyltrialkoxysilane, and the like, in contact with a supporting substrate and situated between the supporting substrate and a photogenerating layer, and which layer may be comprised of the photogenerating pigments of U.S. Pat. No. 5,482,811, the disclosure of which is totally incorporated herein by reference, especially Type V hydroxygallium phthalocyanine.

Illustrated in U.S. Pat. No. 5,493,016, the disclosure of which is totally incorporated herein by reference, are imaging members comprised of a supporting substrate, a photogenerating layer of hydroxygallium phthalocyanine, a charge transport layer, a perylene photogenerating layer, which is preferably a mixture of bisbenzimidazo(2,1-a-1', 2'-b)anthra(2,1,9-def:6,5,10-d'e'f')diisoquinoline-6,11-dione and bisbenzimidazo(2,1-a:2',1'-a)anthra(2,1,9-def:6,5,10-d'e'f')diisoquinoline-10,21-dione, reference U.S. Pat. No. 4,587,189, the disclosure of which is totally incorporated herein by reference; and as a top layer a second charge transport layer.

SUMMARY

It is a feature of the present invention to provide novel polycarbonates with many of the advantages illustrated herein.

It is yet another feature of the present invention to provide a crosslinkable polycarbonate composition.

It is yet another feature of the present invention to provide crosslinkable polycarbonates by the formation of a siloxane functionality.

A further feature of the present invention is the provision of polycarbonate compositions which contain pendant silane groups along the polymer backbone, and which can upon hydrolysis and condensation form a crosslinked siloxane structure.

It is yet another feature of the present invention to provide crosslinkable polycarbonates, which provide surface hardness and excellent mechanical wear resistance characteristics.

In an associated feature of the present invention there are provided processes for the preparation of polycarbonate compositions.

Aspects of the present invention relate to a polycarbonate comprised of a repeating unit represented by Formula (I)

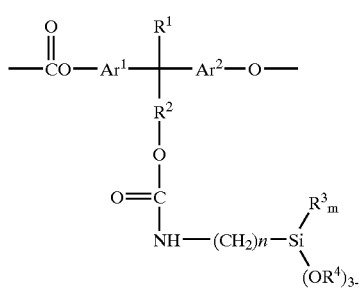

wherein $R^1$ is selected from the group consisting of hydrogen, alkyl optionally containing from about 1 to about 15 carbon atoms, halogenated alkyl optionally containing from about 1 to about 15 carbon atoms, alkyl optionally containing one or more heteroatoms selected from the group consisting of nitrogen, oxygen, sulfur, silicon, and phosphorus; aryl optionally containing from about 6 to about 15 carbon atoms or substituted aryl optionally containing from about 6 to about 15 carbon atoms; $R^2$ represents a divalent linkage selected from the group consisting of alkylene optionally of from 1 to about 15 carbon atoms, alkylene optionally of from 1 to about 15 carbon atoms containing one or more heteroatoms of halogen, nitrogen, oxygen, sulfur, silicon, and phosphorus, arylalkylene optionally of from 1 to about 15 carbon atoms, and arylene optionally of from 1 to about 15 carbon atoms; $Ar^1$ and $Ar^2$ each independently represent aromatic groups containing from about 6 to about 30 carbon atoms; n represent the number of segments of from 1 to about 10; $R^3$ represents an alkyl group optionally containing from about 1 to about 10 carbon atoms, an aryl group optionally containing from about 6 to about 15 carbon atoms; $R^4$ represents an alkyl group optionally containing from about 1 to about 5 carbon atoms, and m is 0, 1 or 2; a polycarbonate comprised of a repeating unit represented by Formula (I)

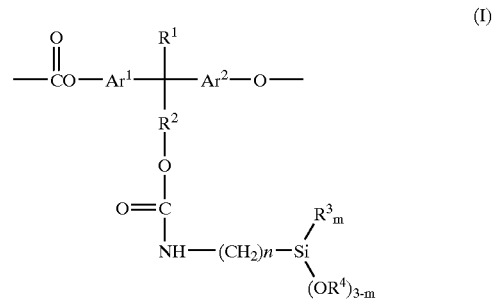

wherein $R^1$ is selected from the group consisting of hydrogen, alkyl containing from about 1 to about 12 carbon atoms, halogenated alkyl containing from about 1 to about 15 carbon atoms, alkyl containing one or more heteroatoms selected from the group consisting of nitrogen, oxygen, sulfur, silicon, and phosphorus; aryl containing from about 6 to about 15 carbon atoms or substituted aryl containing from about 6 to about 36 carbon atoms; $R^2$ represents a divalent linkage selected from the group consisting of alkylene of from 1 to about 15 carbon atoms, alkylene of from 1 to about 20 carbon atoms containing one or more heteroatoms of halogen, nitrogen, oxygen, sulfur, silicon, and phosphorus, arylalkylene of from 1 to about 15 carbon atoms, and arylene of from 1 to about 15 carbon atoms; $Ar^1$ and $Ar^2$ each independently represent aromatic groups containing from about 6 to is about 30 carbon atoms; n represents the number of segments of from 1 to about 10; $R^3$ represents an alkyl group containing from about 1 to about 10 carbon atoms, an aryl group containing from about 6 to about 15 carbon atoms; $R^4$ represents an alkyl group containing from about 1 to about 5 carbon atoms, and m is 0, 1 or 2; and one or more repeating units represented by Formula (II)

wherein A is a divalent hydrocarbon linkage of from about 2 to about 30 carbons, or optionally a divalent hydrocarbon linkage of from about 2 to about 30 carbon atoms further containing a heteroatom of oxygen, nitrogen, sulfur, silicon, or phosphorus; a polycarbonate as represented by Formula (III)

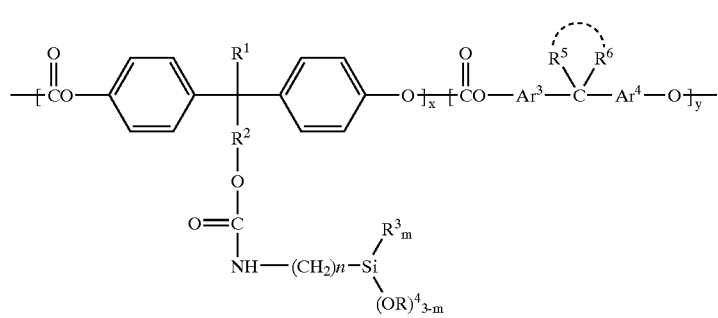

(III)

wherein $R^1$ is selected from the group consisting of hydrogen, alkyl of from about 1 to about 15 carbon atoms (the carbon chain lengths throughout are intended to be optional), a halogenated alkyl of from about 1 to about 15 carbon atoms, an alkyl of from about 1 to about 15 carbon atoms further containing one or more heteroatoms selected from the group consisting of nitrogen, oxygen, sulfur, silicon, and phosphorus, an aryl or substituted aryl of from about 6 to about 30 carbon atoms; $R^2$ represents a divalent linkage, which is selected from the group consisting of an alkylene of from about 1 to about 15 carbon atoms; n is an integer selected from 1 to about 10; $R^3$ represents an alkyl group containing from about 1 to about 10 carbon atoms, an aryl group containing from about 6 to about 15 carbon atoms; $R^4$ represents an alkyl group containing from about 1 to about 5 carbon atoms, m is 0, 1 or 2; $Ar^3$ and $Ar^4$ each independently represent aromatic groups of from about 6 to about 30 carbon atoms; $R^5$ and $R^6$ are independently selected from the group consisting of hydrogen, alkyl of from about 1 to about 15 carbon atoms, aryl or substituted aryl of from about 6 to about 30 carbon atoms; wherein R and $R^6$ may form a combined ring structure containing from about 5 to about 20 carbon atoms; and wherein x and y are the mole fractions of the repeating units such that x+y is equal to 1; a process for the preparation of the polycarbonates of Formula III which process comprises the reaction of a hydroxyl polycarbonate and an isocyanatoalkoxysilane, which reaction is at a temperature of from about 50° C. to about 200° C.; a polycarbonate comprised of a repeating unit represented by Formula (I)

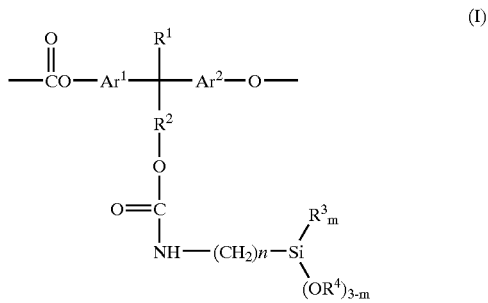

(I)

wherein $R^1$ is selected from the group consisting of hydrogen, alkyl, halogenated alkyl, alkyl selected from the group consisting of nitrogen, oxygen, sulfur, silicon, and phosphorus; aryl or substituted aryl; $R^2$ represents a divalent linkage selected from the group consisting of alkylene, alkylene containing one or more heteroatoms of halogen, nitrogen, oxygen, sulfur, silicon, and phosphorus, arylalkylene and arylene; $Ar^1$ and $Ar^2$ each independently represent aromatic groups; n represents the number of segments; $R^3$ represents an alkyl group, an aryl group; $R^4$ represents an alkyl group, and m is 0, 1 or 2; polycarbonate compositions comprised of a repeating unit or segment as illustrated with reference to Formula (I)

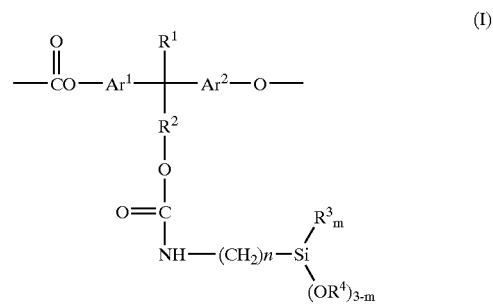

(I)

wherein $R^1$ is selected from the group consisting of hydrogen, alkyl, halogenated alkyl, alkyl containing one or more heteroatoms selected from the group consisting of nitrogen, oxygen, sulfur, silicon, and phosphorus; $R^2$ represents a divalent linkage; $Ar^1$ and $Ar^2$ each independently represent aromatic groups; n is an integer; $R^3$ represents an alkyl, or an aryl group; $R^4$ represents an alkyl group; and m is 0, 1 or 2.

The aforementioned polycarbonate compositions may also include at least one repeating segment represented by Formula (II)

(II)

wherein A is a divalent hydrocarbon linkage of from about 2 to about 30 carbons, or a divalent hydrocarbon linkage of from about 2 to about 30 carbons further containing a heteroatom of oxygen, nitrogen, sulfur, silicon, and phosphorus. Typical examples are

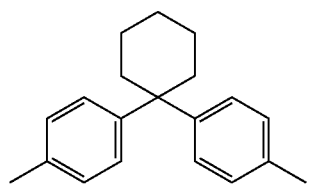

-continued

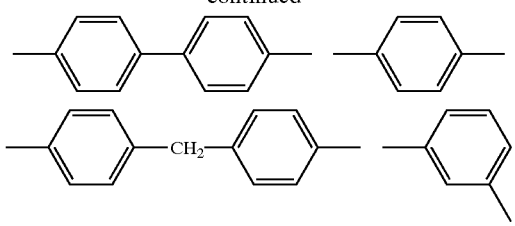

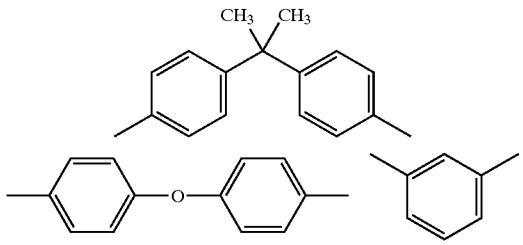

-continued

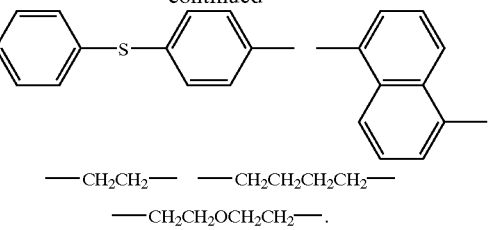

—CH₂CH₂—  —CH₂CH₂CH₂CH₂—

—CH₂CH₂OCH₂CH₂—.

The polycarbonate composition generally contains from 1 to about 100 percent of (I), or more specifically, from about 50 percent to about 95 percent of (I). The polycarbonate composition may contain from 0 to about 99 percent of other segments comprised of one or more of (II), for example from about 1 to about 10, more specifically from about 1 to about 5.

In embodiments the polycarbonates are represented by the general Formula (III)

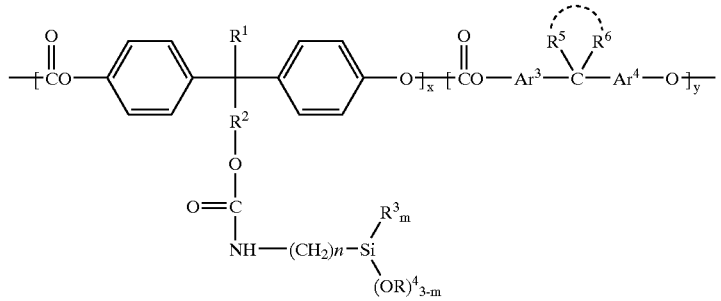

-continued

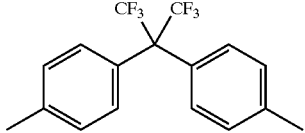

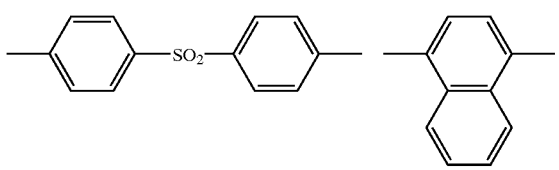

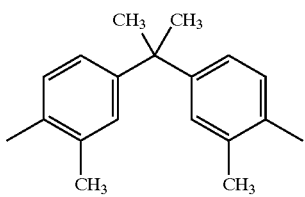

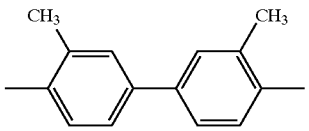

wherein $R^1$ is selected from the group consisting of hydrogen, alkyl of from about 1 to about 20 carbons (for carbon chain lengths throughout, such lengths represent examples), a halogenated alkyl of from about 1 to about 20 carbons, an alkyl of from about 1 to about 12 carbons further containing one or more heteroatoms selected from the group consisting of nitrogen, oxygen, sulfur, silicon, and phosphorus, an aryl or substituted aryl of from about 6 to about 36 carbon atoms; $R^2$ represents a divalent linkage, which is selected from the group consisting of an alkylene of from about 2 to about 12 carbons, $R^3$ is selected from alkyl of from about 1 to about 10 carbon atoms, aryl of from about 6 to about 18 carbon atoms; $R^4$ is selected from alkyl of from about 1 to about 5 carbon atoms; $Ar^3$ and $Ar^4$ each independently represent aromatic groups of from about 6 to about 30 carbon atoms; $R^5$ and $R^6$ are independently selected from the group consisting of hydrogen, alkyl of from about 1 to about 12 carbon atoms, aryl or substituted aryl of from about 6 to about 30 carbon atoms; wherein $R^5$ and $R^6$ may form a combined ring structure containing from about 5 to about 20 carbon atoms; n is an integer selected from 1 to 5; m is 0, 1 or 2; wherein x and y are the mole fractions of the repeating units such that x+y is equal to about 1; and wherein the weight average molecular weight, $M_w$, and the number average molecular weight, $M_n$, thereof are, for example, from about 1,000 to about 1,000,000, and more specifically, $M_w$ is preferably from about 1,000 to about 200,000 and $M_n$ is preferably from about 500 to about 100,000, and which $M_w$ and $M_n$ are determined by a Waters Gel Permeation Chromatograph.

In embodiments, the polycarbonate compositions of the present invention are illustrated by Formulas (I), (II), and (III). Typical examples of the group selected for $R^1$ include hydrogen; alkyl having 1 to about 30 carbon atoms, such as methyl, ethyl, propyl, butyl, isopropyl, tertbutyl and the like. The alkyl group may contain a halogen substituent such as fluorine, chlorine, or bromine. Illustrative examples of halogenated alkyl are fluoromethyl, fluoroethyl, perfluoropropyl, fluorobutyl, fluoropentyl, chloromethyl, chloroethyl, and the like.

Typical divalent linkages selected for $R^2$ include alkylene, alkylene aryl with 1 to about 30 carbon atoms, such as methylene, ethylene, trimethylene, tetramethylene, pentamethylene, hexamethylene, and the like; arylene having about 6 to about 30 carbon atoms, such as phenylene, biphenylene, naphthalene, and the like; and alkylenearyl containing about 13 to about 60 carbon atoms, such as methylenephenyl, methylenediphenyl, ethylenephenyl, propylenephenyl, and the like. Typical groups selected for $R^3$ include alkyls and aryls, such as alkyl with 1 to about 10 carbon atoms such as methyl, ethyl, propyl and butyl; the aryl having from about 6 to about 15 carbon atoms such as phenyl, methyl phenyl, biphenyl and the like. Typical groups selected for $R^4$ include alkyls, such as methyl, ethyl, propyl, i-propyl, and the like.

Examples for $R^5$ and $R^6$ include hydrogen; alkyl having 1 to about 30 carbon atoms, such as methyl, ethyl, propyl, butyl, isopropyl, tertbutyl, and the like; substituted alkyl including halogen, such as fluorine, chlorine, and bromine, and alkoxy, such as methoxy, ethoxy, propoxy, isopropoxy, butoxy, and the like. Typical examples of substituted alkyl include fluoromethyl, fluoroethyl, fluoropropyl, chlorobutyl, methoxymethyl, ethoxymethyl, and the like. Typical examples of aryl include aryl groups having about 6 to about 30 carbon atoms, such as phenyl, biphenyl, naphthyl, and the like; and substituted aryl having about 6 to about 30 carbon atoms. Illustrative examples of the substituted aryl are methylphenyl, ethylphenyl, propylphenyl, butylphenyl, dimethylphenyl, trimethylphenyl, tetramethylphenyl, and the like. The substituted aryl may additionally contain a halogen substituent such as fluorine, chlorine, or bromine. Illustrative examples include trifluoromethylphenyl, chlorophenyl, perfluorophenyl, fluorophenyl, dichlorophenyl, and the like. $R^5$ and $R^6$ may form a combined ring structure containing from about 5 to about 20 atoms. Typical examples of the ring structures include cyclopropyl, cyclobutyl, cyclohexyl, cyclopentyl, cyclooctyl, and the like.

Typically, $Ar^1$, $Ar^2$, $Ar^3$, and $Ar^4$ are each aryl, and the substituted derivatives thereof, such as those containing an alkyl or a halogen such as fluorine (fluoride), chlorine or bromine. Typical examples of the group selected for $Ar^1$, $Ar^2$, $Ar^3$, and $Ar^4$ include aryl having about 6 to about 60 carbon atoms, such as phenyl, biphenyl, naphthyl, methylenephenyl, dimethylenephenyl, binaphthyl, and the like. The aryl group may contain a halogen substituent such as fluorine, chlorine, or bromine. Illustrative examples of halogenated aryl are fluorophenyl, perfluorophenyl, fluoromethylphenyl, fluoropropylphenyl, chlorophenyl, dichlorophenyl, and the like.

Illustrative examples of polycarbonates are (IIIa) through (IIIf); wherein x and y are the molar fractions of the repeating monomer units such that the sum of x+y is equal to 1; more specifically, x is from 0.01 to about 100 and y is from 0 to about 99.99.

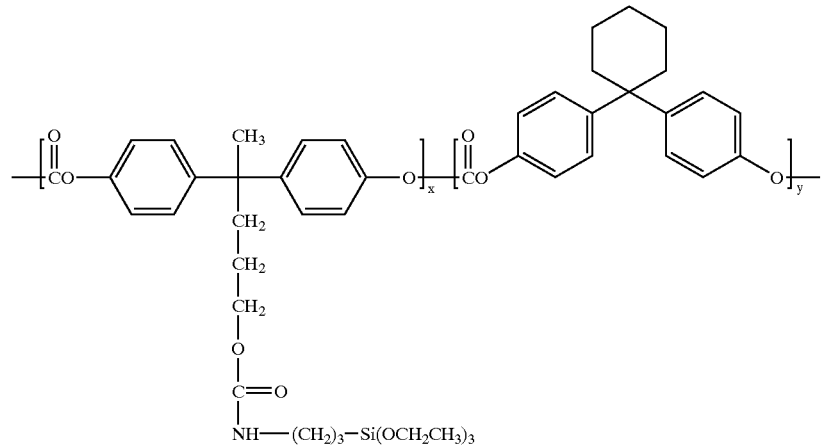

(IIIa)

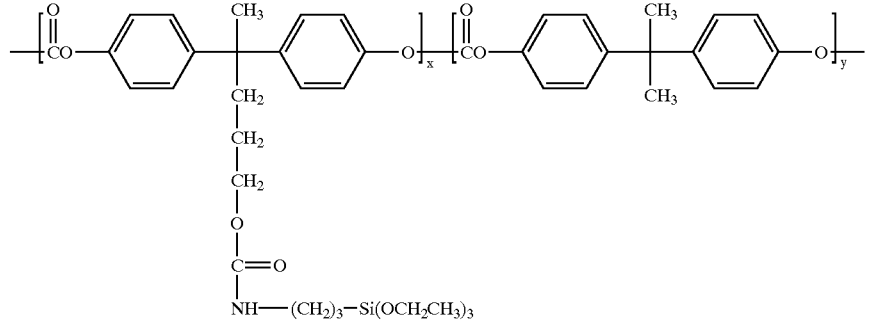

(IIIb)

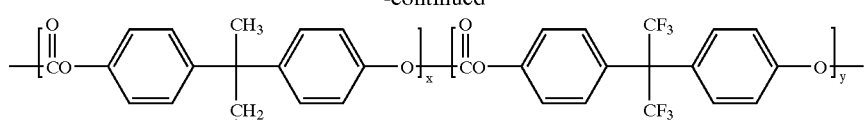

(IIIc)

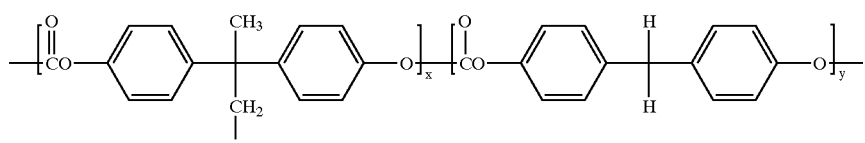

(IIId)

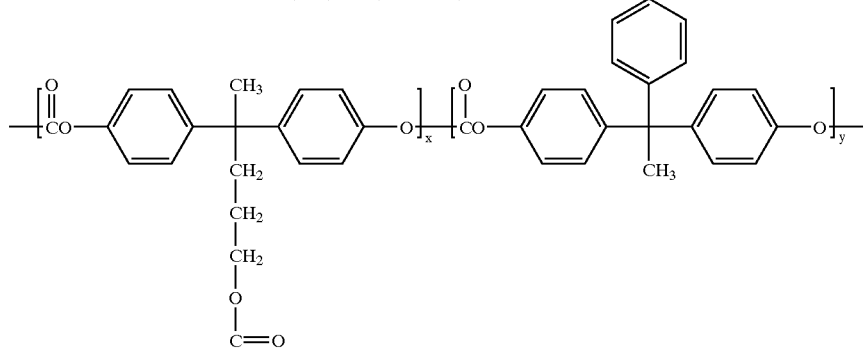

(IIIe)

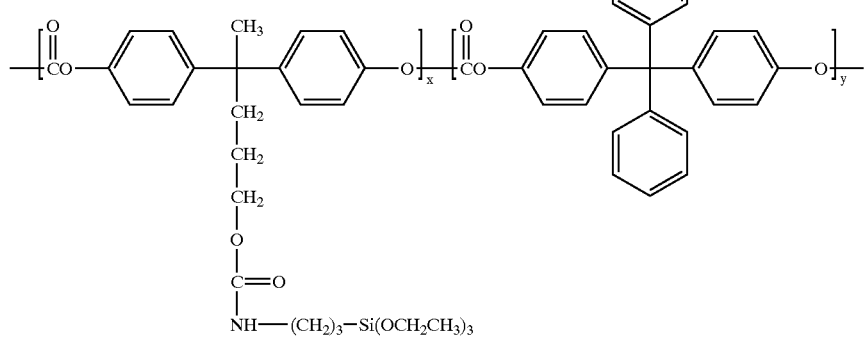

(IIIf)

In embodiments the present invention relates to the provision of the silane-containing polycarbonate compositions of Formula (III). The silane-pendent polycarbonates can be crosslinked by hydrolysis and condensation of silane groups to form siloxane functionality either with itself or with other silane coupling agents, such as alkoxysilanes, for example, methyltrimethoxysilane, phenyltrimethoxysilane, ethyltrimethoxysilane, diphenyldiethoxysilane, dimethyldimethoxysilane, and the like. Typically, the silane hydrolyzes and condenses at a temperature of from about 25° C. to about 200° C., and preferably, from about 50° C. to about 180° C. A typical example reaction is shown in Scheme I. The silane-containing polycarbonates can also react at the surface of inorganic reinforcement particles. Both the crosslinked and the reinforced polycarbonates provide surface hardness and mechanical wear resistance without substantially altering the electrical performance thereof, and therefore, can be used to extend the life of photoresponsive imagining members.

Scheme I

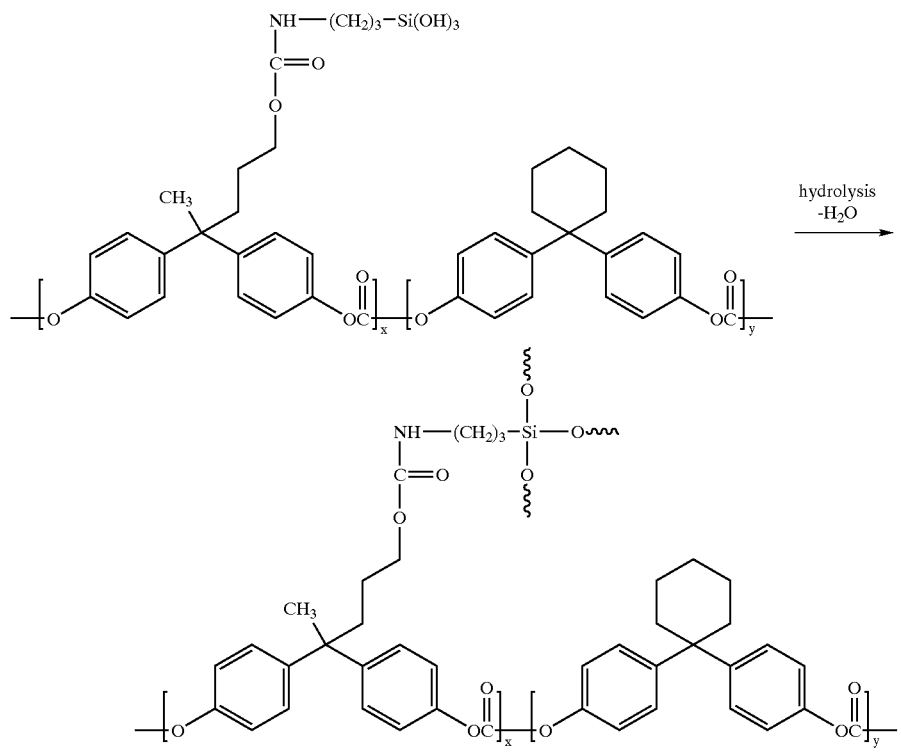

The silane polycarbonate can be prepared from the corresponding hydroxyl polycarbonate by reacting the hydroxyl group with isocyanatoalkoxysilane compounds. A typical example is shown in Scheme II.

Specifically, the hydroxyl polycarbonate (IV) can be heated with an isocyanaloalkoxysilane at a temperature ranging from about 50° C. to about 200° C., and preferably from about 70° C. to about 150° C., in an organic solvent Scheme II

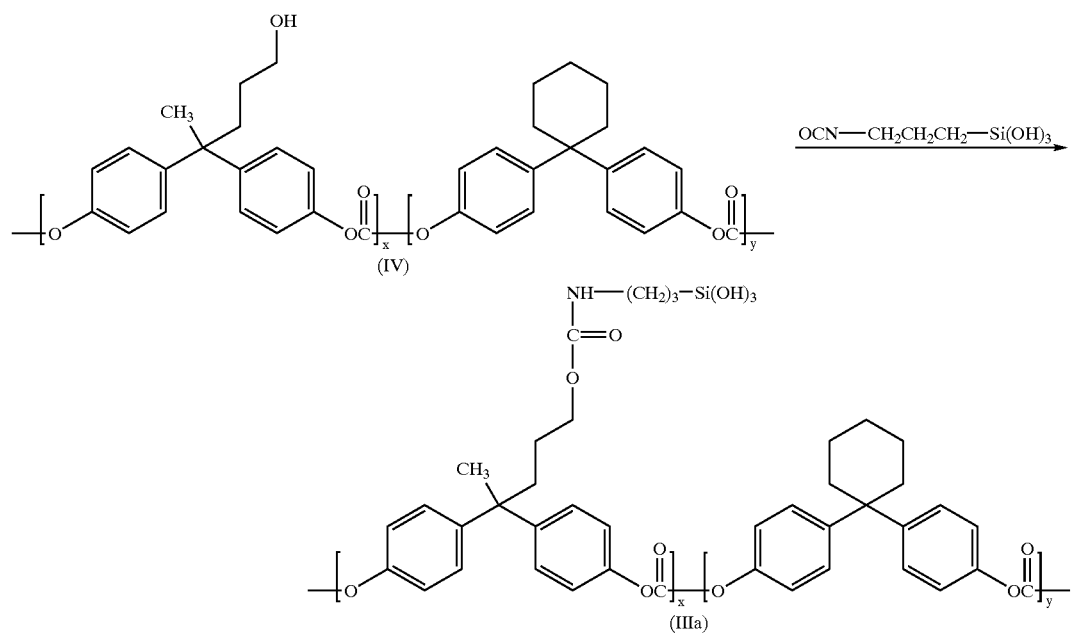

such as toluene, benzene, chlorobenzene, and the like. The reaction can be accomplished by heating at from about 3 to about 24 hours, and preferably from about 5 hours to about 12 hours. Examples of isocyanatoalkoxysilane compounds include 3-(triethoxysilyl)propyl isocyanate, 3-(trimethoxysilyl)propyl isocyanate, 3-(triisopropoxysilyl) propyl isocyanate, or 3-(diethoxymethylsilyl)propyl isocyanate. The resulting alkoxysilane polycarbonate (III) can be precipitated in methanol, collected by filtration, and dried at 70° C. under vacuum.

The following Examples are being submitted to illustrate embodiments of the present invention. These Examples are intended to be illustrative only and are not intended to limit the scope of the present invention. Also, parts and percentages are by weight unless otherwise indicated.

EXAMPLE I

Synthesis of Alkoxysilane Polycarbonate (IIIa; x=0.05, y=0.95)

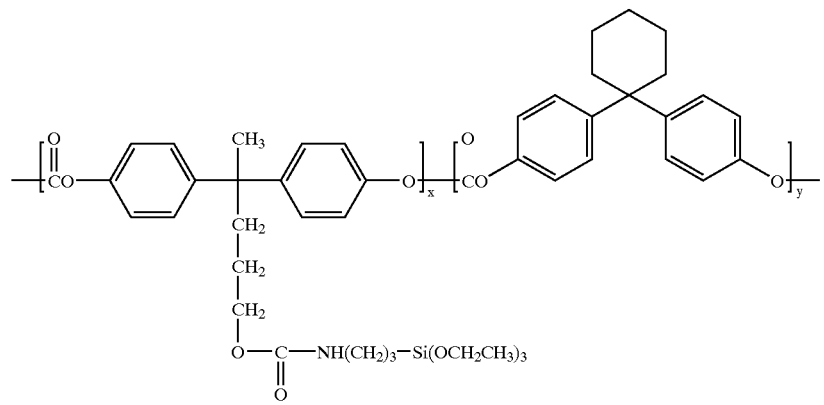

(III-a)

In a 500 milliliter round-bottomed flask, a mixture of the hydroxyl polycarbonate IVa (x=0.05, y=0.95; 10 grams) and 3-(triethoxysilyl)propyl isocyanate (1 gram) was heated in toluene (100 milliliters) at 100° C. (degrees Centigrade throughout) under nitrogen for 8 hours. After cooling to room temperature, about 22° C. to about 25° C., the solution was dropped into methanol. The resulting white polymer fiber was collected by filtration and dried in an oven at 70° C. for 12 hours. The yield of the above silane polycarbonate was 9.5 grams.

EXAMPLE II

Synthesis of Alkoxysilane Polycarbonate (IIIa; x=0.10, V=0.90)

In a 500 milliliter round-bottomed flask, a mixture of the hydroxyl polycarbonate IVa (x=0.10, y=0.90; 10 grams) and 3-(triethoxysilyl)propyl isocyanate (1 gram) was heated in toluene (100 milliliters) at 100° C. under nitrogen for 8 hours. After cooled to room temperature, the solution was dropped into methanol. The resulting white polymer fiber was collected by filtration and dried in an oven at 70° C. for 12 hours. The yield of the silane polycarbonate was 9.8 grams.

EXAMPLE III

Synthesis of Alkoxysilane Polycarbonate (IIIa; x=0.30, y=0.70)

In a 500 milliliter round-bottomed flask, a mixture of the hydroxyl polycarbonate IVa (x=0.30, y=0.70; 10 grams) and 3-(triethoxysilyl)propyl isocyanate (1 gram) was heated in toluene (100 milliliters) at 100° C. under nitrogen for 8 hours. After cooled to room temperature, the solution was dropped into methanol. The resulting white polymer fiber was collected by filtration and dried in an oven at 70° C. for 12 hours. The yield of the silane polycarbonate was 9.2 grams.

EXAMPLE IV

A photoresponsive imaging device was fabricated as follows.

On a 75 micron thick titanized MYLAR® substrate was coated by draw bar techniques a barrier layer formed from hydrolyzed gamma aminopropyltriethoxysilane, and which layer was of a thickness of 0.005 micron. The barrier layer coating composition was prepared by mixing 3-aminopropyltriethoxysilane with ethanol in a 1:50 volume ratio. The coating was allowed to dry for 5 minutes at room temperature, followed by curing for 10 minutes at 110° C. in a forced air oven. On top of the barrier blocking layer was coated a 0.05 micron thick adhesive layer prepared from a solution of 2 weight percent of an E.I. DuPont 49K (49,000) polyester in dichloromethane. A 0.2 micron photogenerating layer was then coated on top of the adhesive layer from a dispersion of hydroxy gallium phthalocyanine Type V (0.46 gram) and a polystyrene-b-polyvinylpyridine block copolymer binder (0.48 gram) in 20 grams of toluene, followed by drying at 100° C. for 10 minutes. Subsequently, a 25 micron hole transport layer (CTL) was coated on top of the photogenerating layer from a solution of N,N'-diphenyl-N,N-bis (3-methyl phenyl)-1,1'-biphenyl-4,4'-diamine (2.64 grams), and the alkoxysilane containing polycarbonate of Formula IIIa (3.5 grams) of Example II in 40 grams of dichloromethane. After coating, the resulting device was dried and cured at 135° C. for 15 minutes to provide an imaging member that exhibited excellent resistance, that is no adverse effects, such as dissolving, in common organic solvents such as, for example, methylenechloride, methanol, or ethanol, and which device was robust and abrasion resistant as determined by an abrasion test with toner particles.

The xerographic electrical properties of the imaging member can be determined by known means, including as indicated herein electrostatically charging the surfaces thereof with a corona discharge source until the surface potentials, as measured by a capacitively coupled probe attached to an electrometer, attained an initial value $V_o$ of about −800 volts. After resting for 0.5 second in the dark, the charged members attained a surface potential of $V_{ddp}$, dark development potential. Each member was then exposed to light from a filtered Xenon lamp with a XBO 150 watt bulb, thereby inducing a photodischarge which resulted in a reduction of surface potential to a $V_{bg}$ value, background potential. The percent of photodischarge was calculated as $100\times(V_{ddp}-V_{bg})/V_{ddp}$. The desired wavelength and energy of the exposed light was determined by the type of filters placed in front of the lamp. The monochromatic light photosensitivity was determined using a narrow band-pass filter.

An illustrative wear test on the drum photoreceptor device of the present invention was accomplished as follows.

Photoreceptor wear was determined by the difference in the thickness of the photoreceptor before and after the wear test. For the thickness measurement, the photoreceptor was mounted onto the sample holder to zero the permascope at the uncoated edge of the photoreceptor; the thickness was measured at one-inch intervals from the top edge of the coating along its length using a permascope, ECT-100, to obtain an average thickness value.

The following table summarizes the electrical and the wear test performance of these devices wherein CTL represents the charge transport layers; the lower the number, the better and more desirable the wear rate. PCZ is a known polycarbonate binder, and CTL is a charge transport layer.

| DEVICE | $V_{ddp}$ (-V) | $E_{1/2}$ (Ergs/cm)$^2$ | Dark Decay (V @ 500 ms) | Vr (V) | Wear (nm/k cycles) |
|---|---|---|---|---|---|
| Control Device with PCZ as CTL binder | 800 | 1.11 | 10.3 | 15 | 51.5 |
| Device with Crosslinked CTL [alkoxysilane polycarbonate] | 800 | 1.33 | 9.5 | 44 | 38.1 |

Lower wear number translates into improved wear resistance.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polycarbonate comprised of a repeating unit represented by Formula (I)

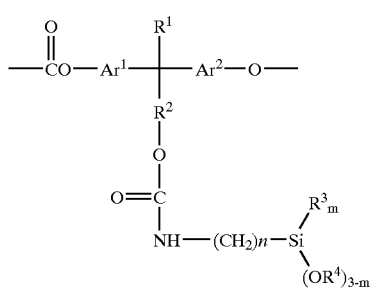

(I)

wherein $R^1$ is selected from the group consisting of hydrogen, alkyl containing from about 1 to about 12 carbon atoms, halogenated alkyl containing from about 1 to about 25 carbon atoms, optionally as alkyl containing one or more heteroatoms selected from the group consisting of nitrogen, oxygen, sulfur, silicon, and phosphorus; aryl optionally containing from about 6 to about 15 carbon atoms or substituted aryl optionally containing from about 6 to about 15 carbon atoms; $R^2$ represents a divalent linkage optionally selected from the group consisting of alkylene of from 1 to about 15 carbon atoms, alkylene of from 1 to about 15 carbon atoms containing one or more heteroatoms of halogen, nitrogen, oxygen, sulfur, silicon, and phosphorus, arylalkylene of optionally from 1 to about 15 carbon atoms, and arylene optionally of from 1 to about 15 carbon atoms; $Ar^1$ and $Ar^2$ each independently represent aromatic groups optionally containing from about 6 to about 30 carbon atoms; n represents the number of segments of from 1 to about 10; $R^3$ represents an alkyl group optionally containing from about 1 to about 10 carbon atoms, an aryl group containing from about 6 to about 15 carbon atoms; $R^4$ represents an alkyl group optionally containing from about 1 to about 5 carbon atoms; and m is 0, 1 or 2.

2. A polycarbonate in accordance with claim 1 wherein said alkyl for $R^1$ is selected from the group consisting of methyl, ethyl, propyl, butyl, pentyl, and hexyl.

3. A polycarbonate in accordance with claim 1 wherein said halogenated alkyl for $R^1$ is selected from the group consisting of fluoroalkyl, perfluoroalkyl, and chloroalkyl.

4. A polycarbonate in accordance with claim 1 wherein $R^2$ is a divalent linkage of alkylene selected from the group consisting of dimethylene, trimethylene, and tetramethylene.

5. A polycarbonate in accordance with claim 1 wherein $Ar^1$ and $Ar^2$ are arylene groups independently selected from the group consisting of

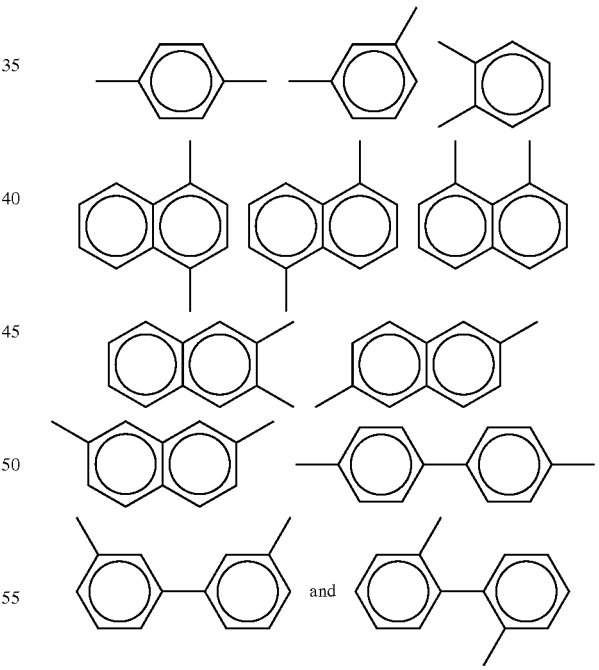

and wherein said arylene optionally contains a substituent selected from the group consisting of hydrogen, halogen, alkyl of from 1 to about 15 carbons, halogenated alkyl of 1 to about 15 carbons, alkyl containing one or more heteroatoms of nitrogen, oxygen, sulfur, silicon, and phosphorus.

6. A polycarbonate in accordance with claim 1 wherein $R^3$ is selected from the group consisting of methyl, ethyl, propyl, butyl, and phenyl.

7. A polycarbonate in accordance with claim 1 wherein $R^4$ is selected from the group consisting of methyl, ethyl, propyl, and isopropyl.

8. A polycarbonate comprised of a repeating unit represented by Formula (I)

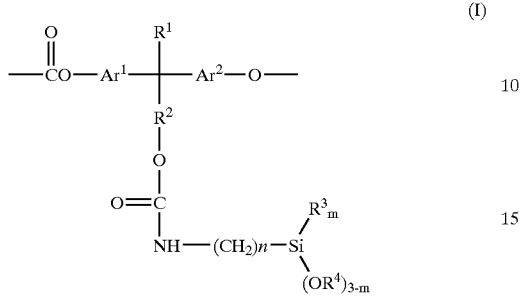

wherein $R^1$ is selected from the group consisting of hydrogen, alkyl containing from about 1 to about 15 carbon atoms, halogenated alkyl containing from about 1 to about 15 carbon atoms, alkyl containing one or more heteroatoms selected from the group consisting of nitrogen, oxygen, sulfur, silicon, and phosphorus; aryl containing from about 6 to about 15 carbon atoms or substituted aryl containing from about 6 to about 15 carbon atoms; $R^2$ represents a divalent linkage selected from the group consisting of alkylene of from 1 to about 15 carbon atoms, alkylene of from 1 to about 15 carbon atoms containing one or more heteroatoms of halogen, nitrogen, oxygen, sulfur, silicon, and phosphorus, arylalkylene of from 1 to about 15 carbon atoms, and arylene of from 1 to about 15 carbon atoms; $Ar^1$ and $Ar^2$ each independently represent aromatic groups containing from about 6 to about 30 carbon atoms; n represents the number of segments of from 1 to about 10; $R^3$ represents an alkyl group containing from about 1 to about 10 carbon atoms, an aryl group containing from about 6 to about 15 carbon atoms; $R^4$ represents an alkyl group containing from about 1 to about 5 carbon atoms, and m is 0, 1 or 2; and one or more repeating units represented by Formula (II)

wherein A is a divalent hydrocarbon linkage of from about 2 to about 30 carbons, or optionally a divalent hydrocarbon linkage of from about 2 to about 30 carbon atoms further containing a heteroatom of oxygen, nitrogen, sulfur, silicon, and phosphorus.

9. A polycarbonate composition in accordance with claim 8 wherein A is selected from the group consisting of

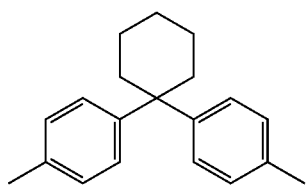

-continued

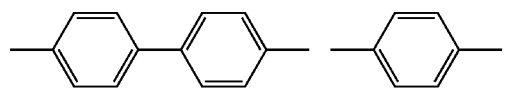

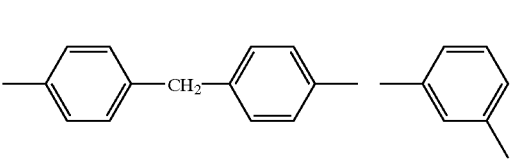

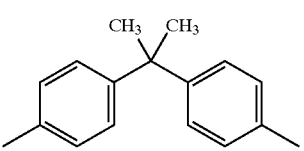

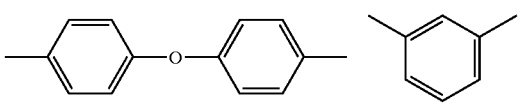

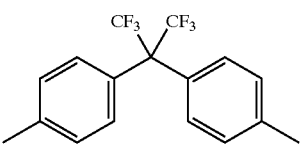

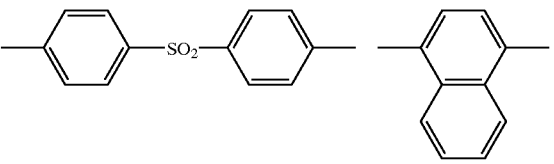

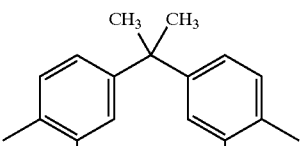

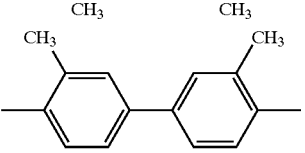

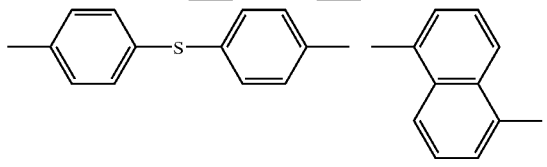

10. A polycarbonate as represented by Formula (III)

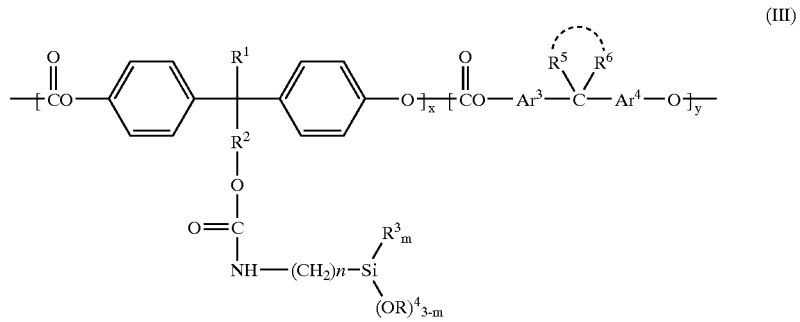

wherein $R^1$ is selected from the group consisting of hydrogen, alkyl of from about 1 to about 15 carbon atoms, a halogenated alkyl of from about 1 to about 15 carbon atoms, an alkyl of from about 1 to about 15 carbon atoms further containing one or more heteroatoms selected from the group consisting of nitrogen, oxygen, sulfur, silicon, and phosphorus, an aryl or substituted aryl of from about 6 to about 30 carbon atoms; $R^2$ represents a divalent linkage, which is selected from the group consisting of an alkylene of from about 1 to about 15 carbon atoms; n is an integer selected from 1 to about 10; $R^3$ represents an alkyl group containing from about 1 to about 10 carbon atoms, an aryl group containing from about 6 to about 15 carbon atoms; $R^4$ represents an alkyl group containing from about 1 to about 5 carbon atoms, m is 0, 1 or 2; $Ar^3$ and $Ar^4$ each independently represent aromatic groups of from about 6 to about 30 carbon atoms; $R^5$ and $R^6$ are independently selected from the group consisting of hydrogen, alkyl of from about 1 to about 15 carbon atoms, aryl or substituted aryl of from about 6 to about 30 carbon atoms; wherein $R^5$ and $R^6$ may form a combined ring structure containing from about 5 to about 20 carbon atoms; and wherein x and y are the mole fractions of the repeating units such that x+y is equal to 1.

11. A polycarbonate in accordance with claim 10 wherein said alkyl for $R^1$ is selected from the group consisting of methyl, ethyl, propyl, butyl, pentyl, and hexyl.

12. A polycarbonate in accordance with claim 10 wherein said halogenated alkyl for $R^1$ is selected from the group consisting of fluoroalkyl, perfluoroalkyl, and chloroalkyl.

13. A polycarbonate in accordance with claim 10 wherein $R^2$ is selected from the group consisting of dimethylene, trimethylene, and tetramethylene.

14. A polycarbonate in accordance with claim 10 wherein $Ar^3$ and $Ar^4$ are arylene groups independently selected from the group consisting of the following formula

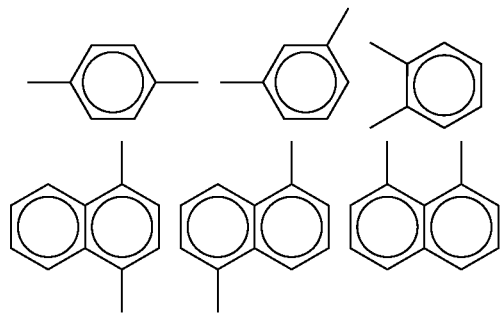

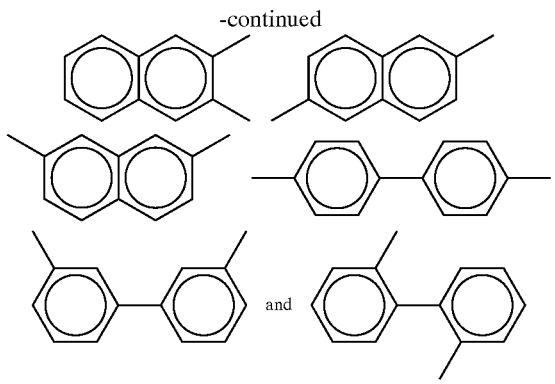

-continued and wherein said arylene optionally contains a substituent selected from the group consisting of hydrogen, halogen, alkyl of from 1 to about 15 carbon atoms, halogenated alkyl of 1 to about 15 carbon atoms, and alkyl containing one or more heteroatoms of nitrogen, oxygen, sulfur, silicon, or phosphorus.

15. A polycarbonate in accordance with claim 10 wherein $R^3$ is selected from the group consisting of methyl, ethyl, propyl, butyl and phenyl.

16. A polycarbonate in accordance with claim 10 wherein $R^4$ is alkyl selected from the group consisting of methyl, ethyl, propyl, and isopropyl.

17. A polycarbonate in accordance with claim 10 wherein $R^5$ and $R^6$ are alkyl independently selected from the group consisting of methyl, ethyl, propyl, trifluoromethyl, and 3,3,3-trifluoropropyl.

18. A polycarbonate in accordance with claim 10 wherein $R^5$ and $R^6$ form a combined ring structure of from about 5 to about 10 members.

19. A polycarbonate in accordance with claim 10 wherein $R^1$ is methyl; $R^2$ is trimethylene; $R^4$ is methyl; n is 3, and m is 0.

20. A polycarbonate in accordance with claim 10 wherein said polycarbonate possesses a weight average molecular weight of from about 2,000 to about 500,000.

21. A polycarbonate in accordance with claim 10 wherein said polycarbonate is comprised of (IIIa)

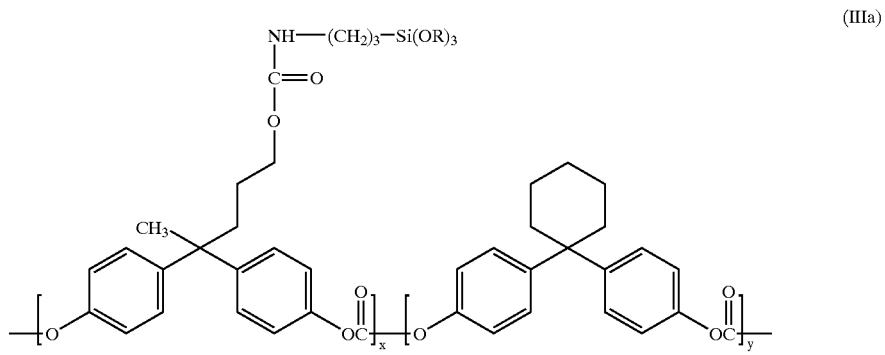

wherein x and y are the mole fractions of the repeating units such that x+y is equal to 1, and wherein said polycarbonate possesses a molecular weight of from about 2,000 to about 500,000.

22. A polycarbonate in accordance with claim 10 wherein said polycarbonate is crosslinked by hydrolysis and condensation of the pendent silane group with itself or with other silane coupling agents.

23. A polycarbonate in accordance with claim 22 wherein said crosslinked product is of the following formulas

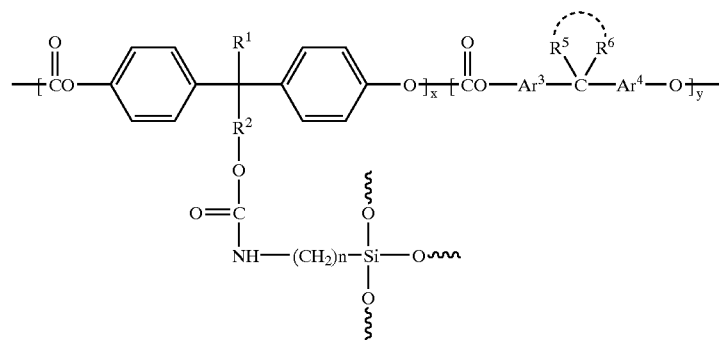

wherein $R^1$ is selected from the group consisting of hydrogen, alkyl of from about 1 to about 12 carbon atoms, a halogenated alkyl of from about 1 to about 15 carbon atoms, an alkyl of from about 1 to about 12 carbon atoms further containing one or more heteroatoms selected from the group consisting of nitrogen, oxygen, sulfur, silicon, and phosphorus, aryl of from about 6 to about 30 carbon atoms; $R^2$ represents a divalent linkage, which is selected from the group consisting of an alkylene of from about 1 to about 15 carbon atoms, $Ar^3$ and $Ar^4$ each independently represent aromatic groups of from about 6 to about 30 carbon atoms; $R^5$ and $R^6$ are independently selected from the group consisting of hydrogen, alkyl of from about 1 to about 12 carbon atoms, aryl of from about 6 to about 30 carbon atoms; n is from 1 to about 5; wherein x and y are the mole fractions of the repeating units such that x+y is equal to 1.

24. A polycarbonate in accordance with claim 23 wherein said crosslinked product is of the following formula

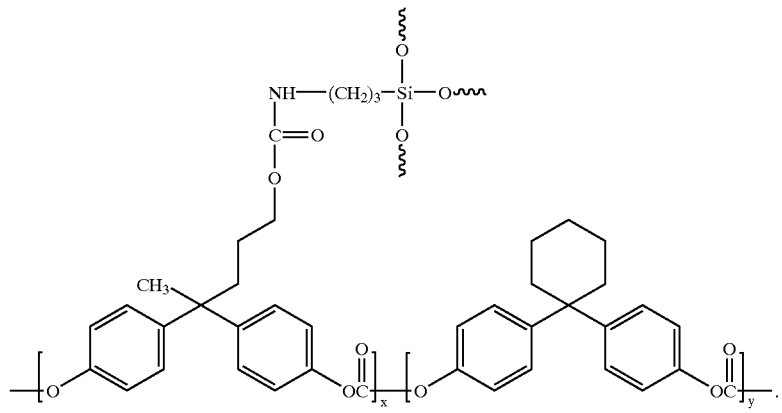

25. A polycarbonate in accordance with claim 22 wherein said silane coupling agent is tetraalkyl orthosilicate, trialkoxysilane, dialkoxysilane, or a silane containing one or more heteroatoms selected from the group consisting of nitrogen, oxygen, sulfur, and phosphorus.

26. A polycarbonate in accordance with claim 22 wherein said silane coupling agent is tetraethyl orthosilicate, tetrapropyl orthosilicate, methyltrimethoxysilane, ethyltrimethoxysilane, phenyltrimethoxysilane, 3-aminopropyltrimethoxysilane, N-[3-(trimethoxysilyl)propyl]-ethylenediamine, or 3-glycidoxypropyltrimethoxysilane.

27. A process for the preparation of the polycarbonates of Formula III which process comprises the reaction of a hydroxyl polycarbonate and an isocyanatoalkoxysilane, which reaction is at a temperature of from about 50° C. to about 200° C.

28. A process in accordance with claim 27 wherein said isocyanatoalkoxysilane is 3-(triethoxysilyl)propyl isocyanate, 3-(trimethoxysilyl)propyl isocyanate, 3-(triisopropoxysilyl)propyl isocyanate, or 3-(diethoxymethylsilyl)propyl isocyanate.

29. A polycarbonate comprised of a repeating unit represented by Formula (I)

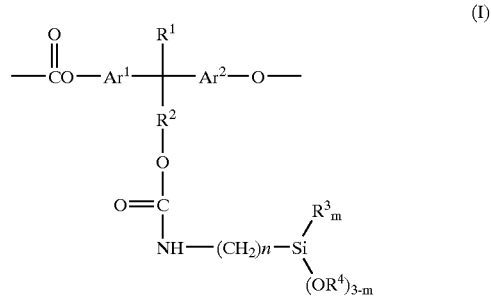

wherein $R^1$ is selected from the group consisting of hydrogen, alkyl, halogenated alkyl, and aryl; $R^2$ represents a divalent linkage; $Ar^1$ and $Ar^2$ each independently represent aromatic groups; n represents the number of segments or units; $R^3$ represents an alkyl group, or an aryl group; $R^4$ represents an alkyl group; and m is 0, 1 or 2.

* * * * *